(12) United States Patent
Bettermann et al.

(10) Patent No.: US 8,932,025 B2
(45) Date of Patent: Jan. 13, 2015

(54) ROTOR BLADE WITH AN INTEGRATED RADAR ABSORBER FOR A WIND POWER PLANT

(75) Inventors: Joachim Bettermann, Delmenhorst (DE); Andreas Frye, Stuhr (DE)

(73) Assignee: EADS Deutschland GmbH, Ottobrunn (DE)

( * ) Notice: Subject to any disclaimer, the term of this patent is extended or adjusted under 35 U.S.C. 154(b) by 1072 days.

(21) Appl. No.: 12/993,655

(22) PCT Filed: May 16, 2009

(86) PCT No.: PCT/DE2009/000689
§ 371 (c)(1),
(2), (4) Date: Jan. 4, 2011

(87) PCT Pub. No.: WO2009/140949
PCT Pub. Date: Nov. 26, 2009

(65) Prior Publication Data
US 2011/0129352 A1    Jun. 2, 2011

(30) Foreign Application Priority Data

May 21, 2008    (DE) .......................... 10 2008 024 644

(51) Int. Cl.
*F04D 29/38*    (2006.01)
*H01Q 1/12*    (2006.01)
(Continued)

(52) U.S. Cl.
CPC .................. *H01Q 1/12* (2013.01); *F03D 11/00* (2013.01); *H01Q 17/00* (2013.01); *F05B 2260/99* (2013.01); *F05B 2280/6003* (2013.01); *F05B 2280/6011* (2013.01); *F05B 2280/6013* (2013.01); *F05C 2253/04* (2013.01);
(Continued)

(58) Field of Classification Search
USPC ...................................................... 416/241 A
See application file for complete search history.

(56) References Cited

U.S. PATENT DOCUMENTS 2,599,944 A    6/1952  Salisbury
7,198,471 B2 *  4/2007  Gunneskov et al. ...... 416/229 R
(Continued)

FOREIGN PATENT DOCUMENTS

DE    42 16 837 A1    11/1993
DE    38 21 588 C1    2/1998
(Continued)

OTHER PUBLICATIONS

German Office Action dated Feb. 11, 2009 (Four (4) pages).
(Continued)

*Primary Examiner* — Edward Look
*Assistant Examiner* — Jeffrey A Brownson
(74) *Attorney, Agent, or Firm* — Crowell & Moring LLP

(57) ABSTRACT

A rotor blade comprising fiber-reinforced plastic for a wind power plant is provided with a radar absorber embedded into the fiber-reinforced plastic. The rotor blade includes a layer close to the surface with a defined electrical sheet resistivity of 100 to 800 ohm/square, which is located at a depth of 2 to 5 mm below the surface. The rotor blade also includes a layer far removed from the surface with a defined electrical sheet resistivity of at a maximum 50 ohm/square at a distance to the layer close to the surface of 5 to 16 mm. The integrated radar absorber covers one or several discrete surface sections of the rotor blade, without covering the entire surface of the rotor blade.

4 Claims, 4 Drawing Sheets

(51) Int. Cl.
 *F03D 11/00* (2006.01)
 *H01Q 17/00* (2006.01)
(52) U.S. Cl.
 CPC ......... *F05C2253/12* (2013.01); *F05C 2253/16* (2013.01); *Y02E 10/721* (2013.01); *Y02E 10/722* (2013.01)
 USPC ...................................................... 416/241 A

(56) References Cited

U.S. PATENT DOCUMENTS

2007/0183888 A1 8/2007 Gunneskov et al.
2009/0121491 A1 5/2009 Mikkelsen

FOREIGN PATENT DOCUMENTS

| DE | 199 29 081 A1 | 10/2000 |
| DE | 602 03 804 T2 | 10/2005 |
| EP | 0 378 839 A2 | 7/1990 |
| EP | 0 499 868 A2 | 8/1992 |
| EP | 0 677 888 A1 | 10/1995 |
| GB | 2 327 925 A | 2/1999 |

OTHER PUBLICATIONS

International Search Report including English translation dated Aug. 31, 2009 and PCT/ISA/237 Form (Fifteen (15) pages).
Paul Saville, "Review of radar Absorbing Materials", Defence R&D, Jan. 3, 2005, XP-002541734.

\* cited by examiner a)

b)

a)

Time x b)

Time x a)  VS   ES b)

Frequency (GHz)

a)

b)

c)

ROTOR BLADE WITH AN INTEGRATED RADAR ABSORBER FOR A WIND POWER PLANT

CROSS-REFERENCE TO RELATED APPLICATIONS

The present application is a national stage of PCT/DE2009/000689, filed May 16, 2009, and claims priority under 35 U.S.C. §119 to German Patent Application No. 10 2008 024 644.1, filed May 21, 2008, the entire disclosure of these documents is herein expressly incorporated by reference.

BACKGROUND AND SUMMARY OF THE INVENTION

The invention relates to a rotor blade consisting of fiber-reinforced plastic for a wind power plant. To decrease radar reflection, it comprises a passive radar absorber that is integrated into the surface.

Flight safety radar systems, which as 2-D radar systems, require the direction and the distance of a flying target in order to display it. Due to the motion of the wind energy rotors, or the rotor blades, such flight safety radar systems generate a moving target. The rotor blades as moving targets are identified just like aircraft, by a sufficiently strong reflection with Doppler components. Thereby, additional moving targets are generated for the radar system, which impede or falsify the flight path of the actual flying target.

From earlier patent applications, for example, DE 199 29 081 A1, inference absorbers and Jaumann absorber designs are known for reducing radar reflection, which ensure a reduction of radar reflection that is of particularly high quality. Because of the very high radar cross-section of a wind power plant of more than 400 $m^2$, however, adequate reflection dampening greater than 20 dB in the operating frequency range of radar systems for flight safety is not guaranteed in all atmospheric conditions. It is common to all previous solutions and production methods that as many surface sections as possible are provided with a reflection-dampening effect.

Exemplary embodiments of the present invention involve a specific use of a radar absorber to ensure that the radar system recognizes the wind power plant as such and is able to differentiate it from an actual flying target.

In particular, exemplary embodiments of the present invention involve a rotor blade for a wind power plant comprising fiber-reinforced plastic; and a radar absorber embedded in the fiber-reinforced plastic. The radar absorber includes a layer close to a surface of the rotor blade at a depth of 2 to 5 mm below the surface, the layer close to the surface having a defined electric sheet resistivity of 100 to 800 ohm/square, and a layer far removed from the surface of the rotor blade at a depth of 5 to 16 mm, the layer far removed from the surface having a defined electric sheet resistivity of at a maximum 50 ohm/square. The embedded radar absorber covers one or several discrete surface sections of the rotor blade, without covering the entire surface of the rotor blade.

In accordance with the invention, the passive radar absorber that is embedded in the fiber-reinforced plastic material of the rotor blade comprises the following elements:

a layer close to the surface, in particular a fibrous web, cloth, knitted fabric or a film. It has a defined electric sheet resistivity of 100 to 800 ohm/square and is located at a depth of 2 to 5 mm underneath the surface of the rotor blade;

a layer far removed from the surface layer at a distance to the layer close to the surface of 5 to 16 mm. The layer far removed from the surface layer can also be designed as fibrous web, cloth, knitted fabric or film. The layer far removed from the surface is a technically conductive layer with a defined electric sheet resistivity of at a maximum 50 ohm/square.

The integrated radar absorber is limited selectively to one or more discrete, i.e. surface areas of the rotor blade that are separated from each other, without covering the entire surface of the rotor blade.

Thereby, the surface areas at the rotor blade edges are preferred, whereby the absorber can also be limited exclusively to surface sections at the rotor blade edges.

In one aspect of the rotor blade, a section of the rotor blade edges is located in at least one of the discrete surface sections at which the radar absorber is present.

In a further aspect, a section of rotor blade edges is present in all discrete surface sections at which a radar absorber is present.

This absorber design in accordance with the invention ensures a mono-static reduction of reflection within a limited angle of incidence.

As the radar absorber does not have to cover all surface sections that are relevant for reflection, this results in advantages with respect to the use of material and weight.

Due to the selective arrangement of the radar absorber on one or several isolated surface sections of the rotor blades, a defined chronologically dependent intensity of reflection is generated during a rotation of the rotor, the characteristic of which makes it possible for the signal processing system of a radar facility to identify this target as wind energy plant and to filter it out. The path formation or tracking of the actual flying target is thereby not impaired.

The quality of the dampening of the reflection by the radar absorber and the use of surfaces by the radar absorber with respect to the design, the dimensions of the rotor blade and the speed of rotation of the rotor make it possible to ensure a defined chronological dependence of the intensity of reflection in the direction of the radar facility.

For the fiber-reinforced plastic material of the rotor blade, the materials that are generally used as starting materials can be used (resin matrix or polymer matrix; carbon fibers, glass fibers or aramide fibers.).

In order to adjust the required electrical sheet resistivity of 100 to 800 ohm/square for the layer of the radar absorber near the surface, commercial fiber materials with low electric conductivity can be adapted correspondingly, for example, by weaving in metallic threads or by coating the fiber material with conductive materials.

In order to be effective for certain polarization orientations of the radar system, the layer of the radar absorber that is close to the surface can have an orientation on the surface, which brings about an orientation-dependent surface conductivity. This can, for example, be achieved by differences in the fiber density or in fiber diameter.

Other objects, advantages and novel features of the present invention will become apparent from the following detailed description of the invention when considered in conjunction with the accompanying drawings.

BRIEF DESCRIPTION OF THE DRAWING FIGURES

The invention will be explained in further detail in conjunction with several figures. Shown are:

FIG. 1a Illustration of the chronological dependence of the radar cross-section of a wind power plant without radar absorber according to the invention;

FIG. 1b illustration of the dynamic radar cross-section of a wind power plant without radar absorber in accordance with the invention that was captured by a radar recirculation delay of 4.2 seconds;

FIG. 2a illustration of the chronological dependence of the radar cross-section of a wind power system with radar absorber according to the invention;

FIG. 2b illustration of the dynamic radar cross-section of a wind power system with radar absorber according to the invention that was captured at a radar recirculation delay 4.2 seconds;

FIG. 3a Design of a radar absorber in accordance with the invention, integrated into the rotor blade of the wind power plant;

FIG. 3b frequency response of the decrease in reflection (in dB) of the radar absorber in accordance with the invention according to FIG. 3a.

FIG. 4 shows a rotor blade in accordance with the invention in three views:
FIG. 4a 3-D view
FIG. 4b cross-section view
FIG. 4c top view

DETAILED DESCRIPTION OF THE DRAWING FIGURES

In conjunction with FIGS. 1 and 2, first the functional principle of the radar absorber according to the invention will be described.

FIGS. 1a and 1b relate to a rotor without radar absorber in accordance with the invention. FIG. 1a shows the chronological dependence by means of which in a period of time of 10 seconds (when continuously illuminated), a wind power plant is detected by a radar system. Due to the rotor motion, a strongly fluctuating cyclic progression with wide maxima can be seen.

FIG. 1b shows an illustration of the dynamic radar cross-section of the wind power plant over a delay time of 60 seconds in arbitrary units (for reasons of simplification, only the rotor blade pointing upward is taken into consideration assuming that the rotor blade generates interfering reflections along its overall extension) that was captured by the radar system. Here, the radar has a recirculation delay of 4.2 seconds, i.e. the radar captures the wind power plant only at successive points in time with a chronological interval corresponding to its recirculation delay. Accordingly, in FIG. 1b, pronounced radar reflexes at intervals of respectively approximately 4.2 seconds can be seen. If a value of 200 units on the vertical axis is used as threshold value, the radar reflex of the wind power plant decreases only twice (at approximately 17 s and 38 s) within 60 seconds in the measurement that is shown. The tracking of the path formation of the target by the radar system is, however, not impaired due to such individual failures of the radar echo. Thus, the radar interprets the wind power plant as moving target.

FIG. 2a and FIG. 2b show the corresponding graphs for a wind power plant with rotor blades according to the invention, i.e. with radar absorbers that are integrated in such. A comparison of FIG. 2a with FIG. 1a shows, that a) the absolute value of the radar cross-section in FIG. 2a is lower than in FIG. 1a
b) the width of the maxima in FIG. 2a is smaller than in FIG. 1a.

Thus, the radar absorber not only ensures a reflection dampening with respect to the maximum strength of the detected signal, but also significantly reduces the width of the maxima.

In dynamic radar cross-sections, (recirculation delay of the radar is respectively 4.2 s), these differences lead to:

a) the absolute values of the radar reflexes in FIG. 2b are lower in general with respect to FIG. 1b,
b) the number of radar reflexes above 200 units in FIG. 2b, is lower on the vertical axis than in FIG. 1b (on average, more than each second radar reflex of the wind power plant fails).

Due to the frequent failure of the radar reflexes of the wind power plant, the signal processing of the radar system can recognize that in this case, it is not a real, but only a mock target, which must be filtered out.

FIG. 3a shows an embodiment in a cross-section illustration of the passive radar absorber in accordance with the invention that is integrated into the rotor blade. The surface of the rotor blade is on the left side. All elements of the absorber are embedded into the fiber-reinforced plastic material of the rotor blade and surrounded by such.

A layer that is close to the surface layer VS (e.g. a fibrous web. cloth, knitted fabric or a film) with a sheet resistivity of 100 to 800 ohm/square is located at a distance of 2 to 5 mm below the surface of the rotor blade. A layer that is far removed from the surface ES (electrically conductive ground surface of the absorber) is located at a distance of 5 to 16 mm below the layer close to the surface VS.

As illustrated in FIG. 3b, the absorber is optimized for a frequency of 2.9 GHz in this embodiment.

In the 3-D illustration of FIG. 4a, two discrete surface sections AB1, AB2 can be seen at which the radar absorber is integrated into the rotor blade R. Both surface sections lie at the rotor blade edges, whereby one AB2 is located at the anterior edge and the other AB1 is located at the posterior edge.

Figure 1:
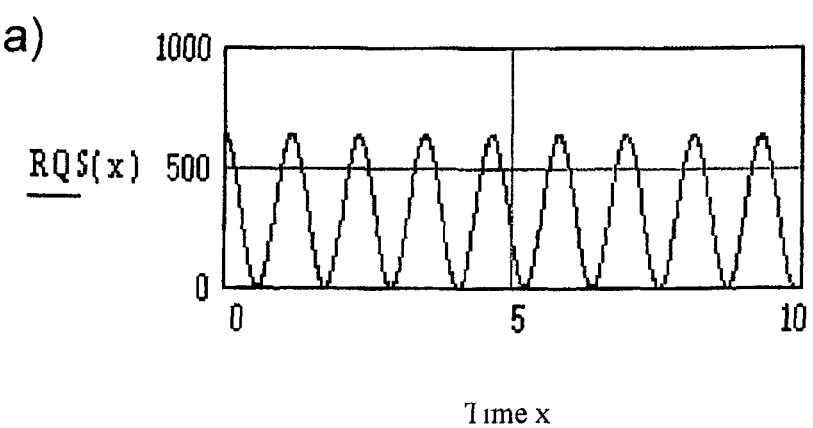
Figure 1:
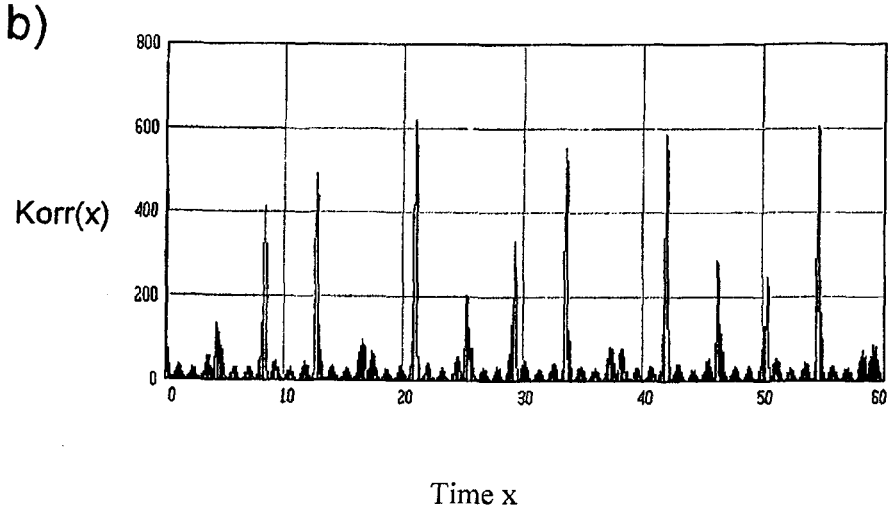
Figure 2:
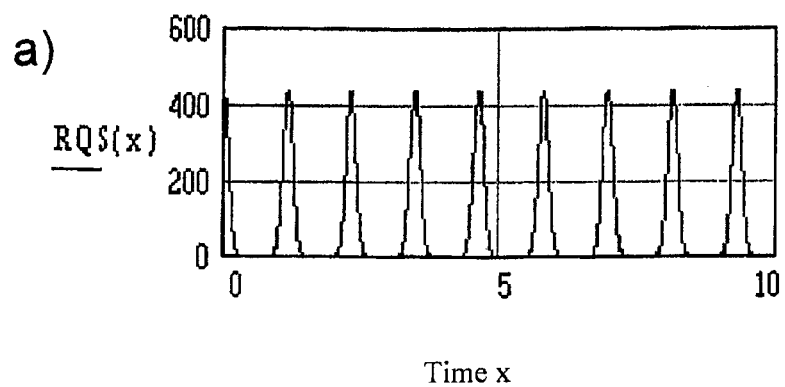
Figure 2:
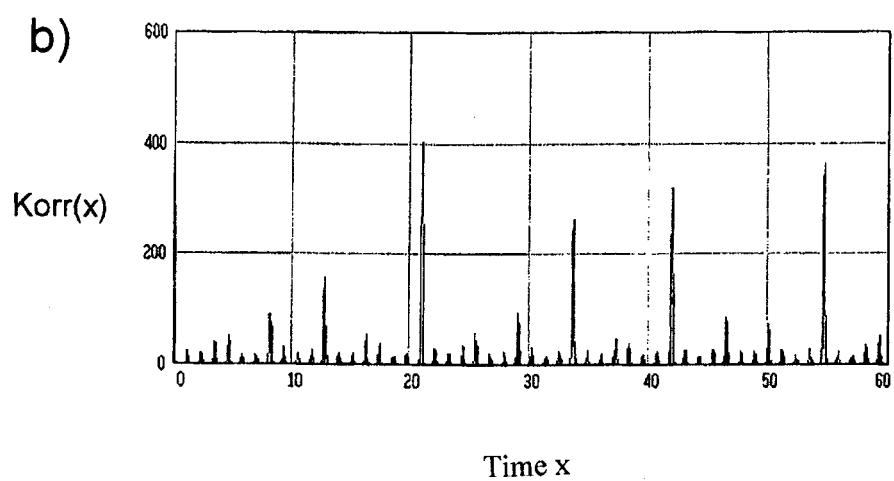
Figure 3:
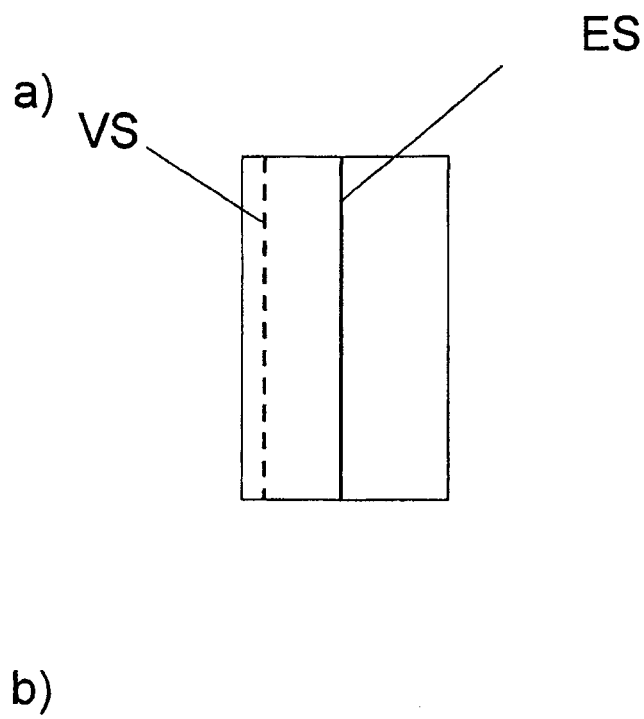
FIG. 3b shows the frequency response of the reflection coefficient pertaining to this absorber.
Figure 3:
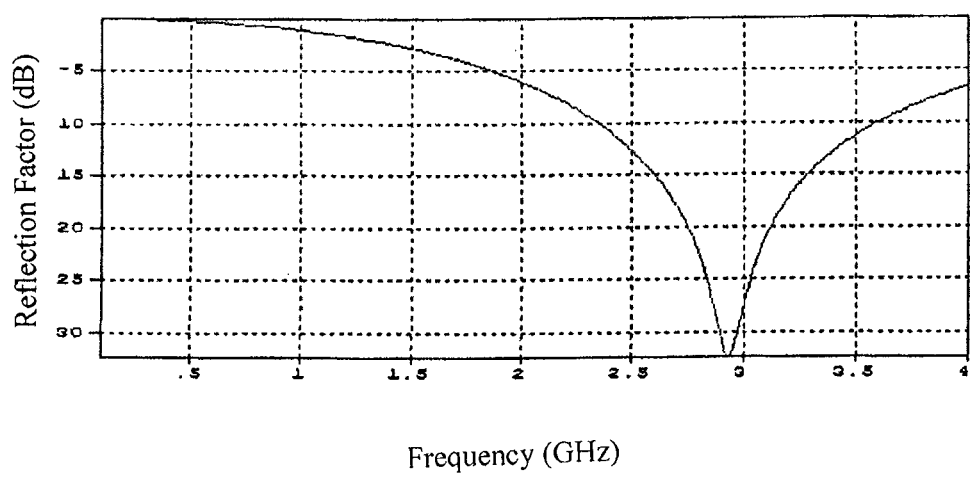
Figure 4:
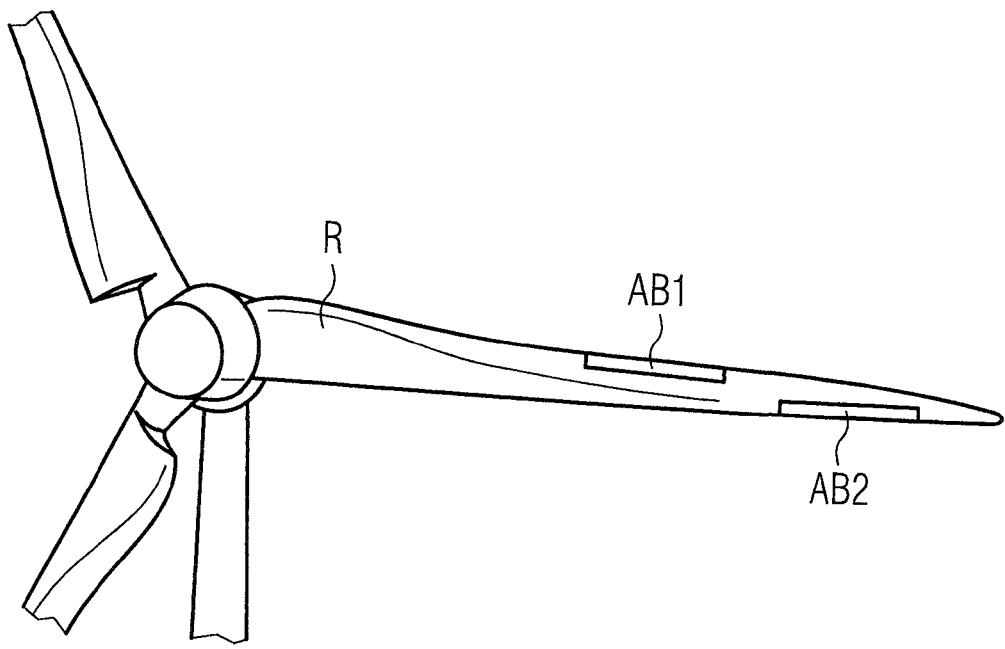
FIG. 4 shows a rotor blade R according to the invention in several views that especially show the distribution of the absorber in the surface of the rotor blade.
Figure 4:
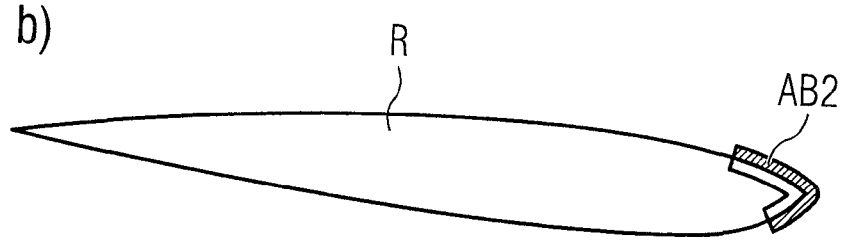
Figure 4:
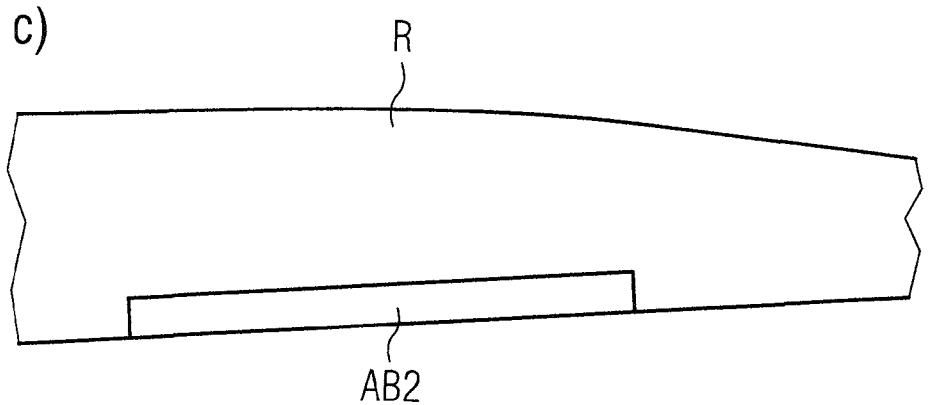

As can be seen from the cross-section illustration according to FIG. 4b, the absorber AB2 is pulled over the rotor edge and thereby distributed asymmetrically on the underside and upper side of the rotor blade (absorber AB1 in the surface section at the posterior edge is not shown in FIG. 4b). One arrangement of the absorbers AB1, AB2 in the direct surroundings of the blade edge, as can generally be seen in FIG. 4a-c, is especially advantageous for the generation of the effect in accordance with the invention. One arrangement of the absorbers that is exclusively at the blade edges such as is shown in FIG. 4, is already sufficient for generating the effect in accordance with the invention. Thereby, it is not necessary to provide the entire length of the blade edges with the absorber.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A rotor blade for a wind power plant comprising:
fiber-reinforced plastic; and
a radar absorber embedded in the fiber-reinforced plastic, wherein the radar absorber includes
a layer close to a surface of the rotor blade at a depth of 2 to 5 mm below the surface, the layer close to the surface having a defined electric sheet resistivity of 100 to 800 ohm/square, a layer far removed from the surface of the rotor blade at a depth of 5 to 16 mm, the layer far removed from the surface having a defined electric sheet resistivity of at a maximum 50 ohm/square, wherein the rotor blade includes a first end and a second end and first and second edges extending on opposite sides of the rotor blade between the first and second ends, and wherein the embedded radar absorber covers several discrete surface sections on the first and second edges of the rotor blade, without covering the entire surface of the rotor blade.

2. The rotor blade according to claim 1, wherein the layer close to the surface is provided with an orientation in the surface of the rotor blade that produces an orientation-dependent surface conductivity.

3. The rotor blade according to claim 1, wherein the layer near the surface comprises a fibrous web, cloth, knitted fabric or a film.

4. The rotor blade according to claim 1, wherein the layer far removed from the surface comprises a fibrous web, cloth, knitted fabric or a film.

\* \* \* \* \*